US012234879B2

(12) United States Patent
Gilbert et al.

(10) Patent No.: US 12,234,879 B2
(45) Date of Patent: Feb. 25, 2025

(54) USER ACCESSIBLE SHOCK TRAVEL SPACER

(71) Applicant: Fox Factory, Inc., Duluth, GA (US)

(72) Inventors: Damon Gilbert, Aptos, CA (US); Andrew Laird, Los Gatos, CA (US); Bryan Wesley Anderson, Santa Cruz, CA (US); William M. Becker, Aptos, CA (US); William O. Brown, IV, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 529 days.

(21) Appl. No.: 17/225,942

(22) Filed: Apr. 8, 2021

(65) Prior Publication Data

US 2021/0317891 A1     Oct. 14, 2021

Related U.S. Application Data

(60) Provisional application No. 63/007,906, filed on Apr. 9, 2020.

(51) Int. Cl.
| | |
|---|---|
| *F16F 9/02* | (2006.01) |
| *F16F 9/44* | (2006.01) |
| *F16F 9/58* | (2006.01) |
| *B62K 25/04* | (2006.01) |
| *B62K 25/06* | (2006.01) |

(52) U.S. Cl.
CPC .......... *F16F 9/0245* (2013.01); *F16F 9/0218* (2013.01); *F16F 9/44* (2013.01); *F16F 9/585* (2013.01); *B62K 2025/048* (2013.01); *B62K 25/06* (2013.01); *B62K 2201/08* (2013.01); *F16F 2222/126* (2013.01); *F16F 2232/08* (2013.01); *F16F 2234/02* (2013.01)

(58) Field of Classification Search
CPC .......... F16F 9/0245; F16F 9/0218; F16F 9/44; F16F 9/584; F16F 2222/126; F16F 2232/08; F16F 2234/02
See application file for complete search history.

(56) References Cited

U.S. PATENT DOCUMENTS

| | | | |
|---|---|---|---|
| 3,986,118 A | 10/1976 | Madigan | |
| 5,535,861 A * | 7/1996 | Young | F16F 9/0227 188/300 |
| 5,952,823 A | 9/1999 | Sprecher et al. | |
| 7,374,028 B2 | 5/2008 | Fox | |
| 7,484,603 B2 | 2/2009 | Fox | |
| 8,627,932 B2 | 1/2014 | Marking | |
| 8,838,335 B2 | 9/2014 | Bass et al. | |
| 8,857,580 B2 | 10/2014 | Marking | |
| 8,955,653 B2 | 2/2015 | Marking | |
| 9,033,122 B2 | 5/2015 | Ericksen et al. | |
| 9,120,362 B2 | 9/2015 | Marking | |

(Continued)

*Primary Examiner* — Xuan Lan Nguyen

(57) ABSTRACT

A user accessible shock travel spacer assembly is disclosed herein. The system is used on a shock assembly having a shaft with an initial predefined stroke length. A retaining cap having a retaining cap thickness and a retaining cap opening therethrough. The retaining cap opening having a diameter that is larger than an outer diameter (OD) of a shaft of a shock assembly. At least one fastener to fasten the retaining cap with a portion of the shock assembly about the shaft, such that the retaining cap reduces a stroke length of the shaft of the shock assembly by the retaining cap thickness.

12 Claims, 11 Drawing Sheets

(56) References Cited

U.S. PATENT DOCUMENTS

| | | |
|---|---|---|
| 9,239,090 B2 | 1/2016 | Marking et al. |
| 9,303,712 B2 | 4/2016 | Cox |
| 9,353,818 B2 | 5/2016 | Marking |
| 10,060,499 B2 | 8/2018 | Ericksen et al. |
| 10,443,671 B2 | 10/2019 | Marking |
| 10,737,546 B2 | 8/2020 | Tong |
| 2003/0132074 A1* | 7/2003 | Robbins ................. B60G 21/10 188/322.15 |
| 2004/0124051 A1* | 7/2004 | Lun .......................... F16F 9/49 188/267.1 |
| 2005/0087414 A1* | 4/2005 | Okimura ................... F16F 7/08 188/381 |
| 2013/0221626 A1* | 8/2013 | Lee ........................ B60G 17/08 280/5.514 |
| 2017/0184173 A1* | 6/2017 | Huang ..................... F16F 9/36 |
| 2017/0356520 A1* | 12/2017 | Bauer ..................... F16F 9/063 |

* cited by examiner

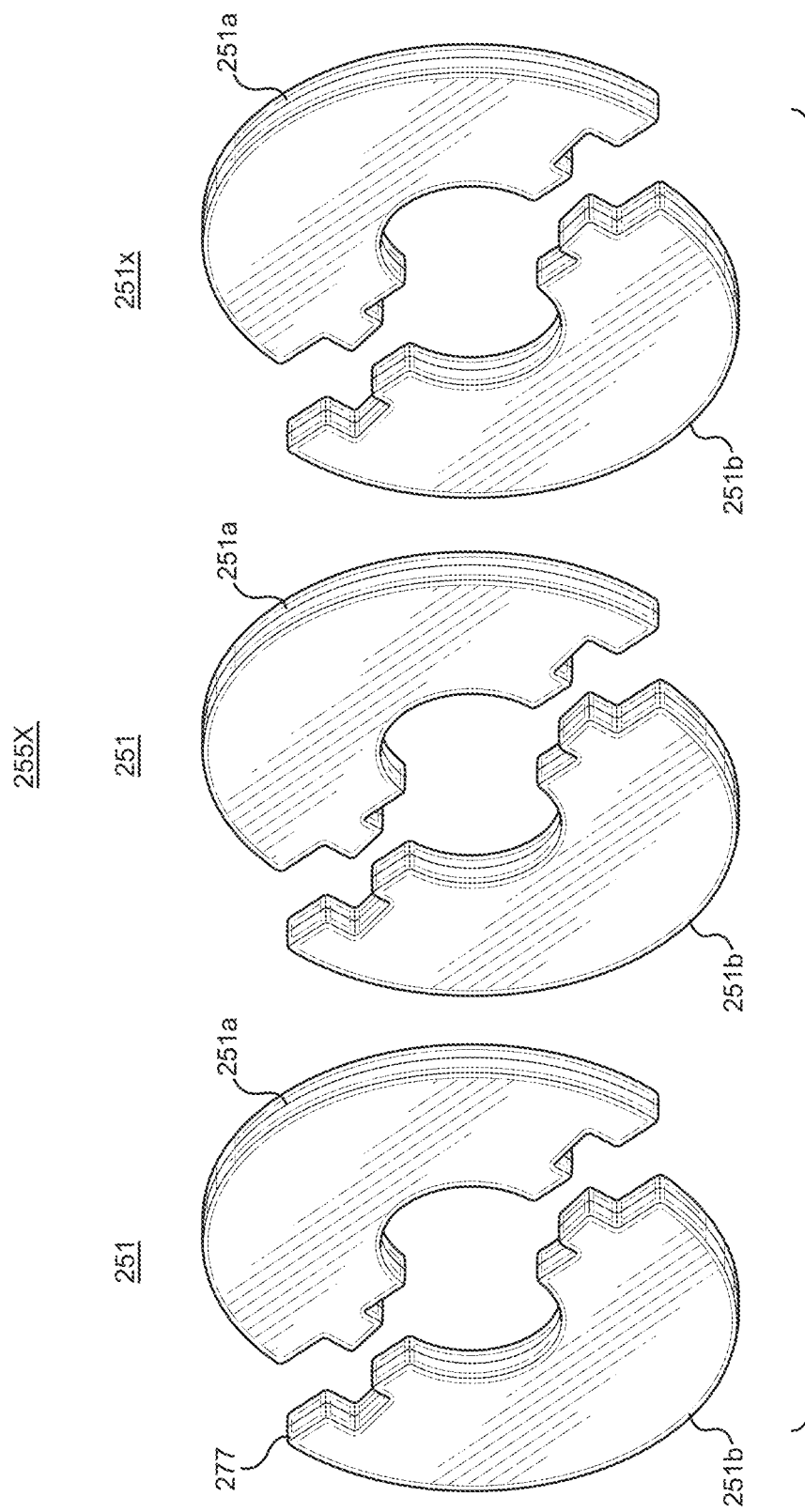

USER ACCESSIBLE SHOCK TRAVEL SPACER

CROSS-REFERENCE TO RELATED APPLICATIONS (PROVISIONAL)

This application claims priority to and benefit of U.S. Provisional Patent Application No. 63/007,906 filed on Apr. 9, 2020, entitled "USER ACCESSIBLE SHOCK TRAVEL SPACER" by Gilbert et al., and assigned to the assignee of the present application, the disclosure of which is hereby incorporated by reference in its entirety.

FIELD OF THE INVENTION

Embodiments of the invention generally relate to methods and apparatus for use in vehicle suspension.

BACKGROUND OF THE INVENTION

Vehicle suspension systems typically include one or more shock assemblies to provide a comfortable ride, enhance performance of a vehicle, and the like. For example, changes in the travel (or stroke) of the suspension are also desired depending upon the terrain. A shorter stroke is usually preferred on a smooth surface while a longer stroke is often the choice for an off-road environment. However, in operation, the real-world suspension firmness and stroke are affected by the amount of weight being suspended. For example, if a vehicle suspension is setup up for a 150-pound rider, when a 200-pound rider borrows (or purchases) the same vehicle, the suspension settings would no longer be correct. Thus, the heavier rider would need to change components of (or the entirety of) the shock to obtain performance characteristics similar to the lighter rider and vice-versa.

BRIEF DESCRIPTION OF THE DRAWINGS

FIG. 2E is an exploded view of travel spacer assembly with no fastener holes, shown in accordance with an embodiment.

Figure 1:
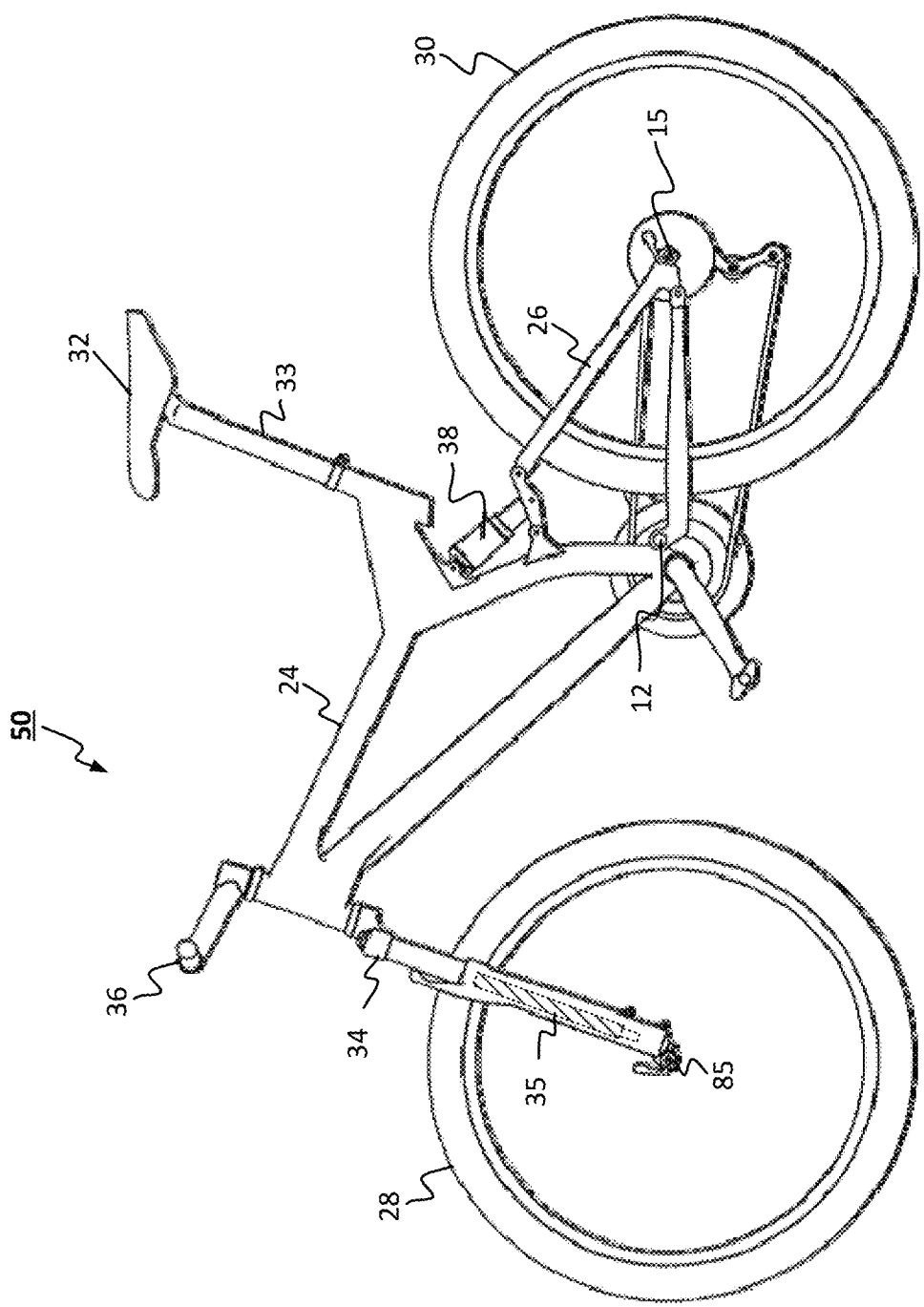
FIG. 1 is a perspective view of a bicycle having a user accessible shock travel spacer integrated with at least one shock assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

In the following discussion, the term initial SAG settings or "SAG" refers to a predefined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

For example, an unloaded motorcycle may have an initially assembled suspension ride height ranging from 30-38 inches from ground to saddle. The manufacturer will then set the manufacturer initial SAG for the vehicle based on a use category, a user weight/height range, the performance envelope, and the like.

In one embodiment, for example, the manufacturer could set the SAG for a 34-inch ride height (a middle of the performance envelope) based on a rider with a weight of 150 lbs. This would mean that unencumbered, the motorcycle would have a seat height that was higher than 34-inches of ride height (such as for example, a seat height of 38 inches). However, when a 150 lb. rider sits on the motorcycle, the suspension would compress and the motorcycle would be at the SAG ride height of 34-inches.

In one embodiment, an owner (or agent of the owner such as a mechanic, friend, shop, or the like) will modify the initial SAG to designate an owner specific SAG. For example, if the user wanted to have a lower ride height, they could adjust, modify, and/or replace one or more of the suspension components to reduce the SAG to 32-inches. In contrast, if the user wanted a higher ride height, they could adjust, modify, and/or replace one or more of the suspension components to increase the SAG to 36-inches.

In one embodiment, the owner could adjust, modify, and/or replace one or more of the suspension components to achieve the manufactures initial SAG. For example, if the rider weighed 250 lbs., when the rider sat on the motorcycle configured for a 150 lb. rider, the ride height would be lower than the 34-inch SAG. As such, the rider would adjust, modify, and/or replace, one or more of the suspension components to return the motorcycle to the 34-inch SAG.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, PWC, boat, motorcycle, or bicycle is loaded with an additional 100 lbs. of cargo in the rear, the extra 100-pound load will cause shock assembly compression (and the like) thereby causing the vehicle to ride lower in the rear (or to ride in a bow up orientation). In general, skewed rear-low ride height will move the vehicle out of SAG and change the vehicle geometry, e.g., cause a slant upward from rear to front. Often, an out of SAG condition is visually identifiable and in this particular example can result in lightness in steering, rear suspension bottom out, forward visual obstruction, and the like.

In one embodiment, for example in a side-by side that is loaded with 250 lbs. of additional weight, the additional weight will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, for example in a truck that is loaded with 500 lbs. of additional weight, when the weight is added to the vehicle, if it is not centered, it will not only cause a change in the front or rear SAG (depending upon the load location fore or aft), but will also cause SAG changes that will differ between the left and right side of the vehicle. For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of deleterious issues including, but not limited to: steering problems, suspension bottom out, loss of control, tire blowout, and vehicle rollover.

In contrast to the examples above, when the weight on the vehicle (e.g., rider, passengers, cargo, etc.) is less than the expectedly loaded vehicle weight, the suspension and one or more shock assemblies will be less compressed, and the vehicle ride height will be higher than the SAG. This lighter loaded situation can also result in a number of deleterious issues including, but not limited to: improper seat height (e.g., a rider will be higher off the ground than expected), change in vehicle height clearance, suspension top-out, suspension issues caused by the vehicle operating outside of the operating envelope for the suspension, and the like.

Additional information regarding SAG and SAG setup can be found in U.S. Pat. No. 8,838,335 which is incorporated by reference herein, in its entirety.

Overview

One embodiment utilizes a travel spacer in the suspension to adjust the stroke of a suspension. However, unlike many other spacer configurations, embodiments described herein allow end users, repair shops, manufacturer's service centers, and the like, to add or remove a travel spacer to increase or decrease shock travel without having to rebleed or charge the shock assembly.

In one embodiment, as one or more travel spacers are added to or removed from inside the air chamber of the air shock portion of the shock assembly, the external geometry of the air chamber, the external geometry of the air shock, and the overall external geometry of the shock assembly will not change. E.g., same eyelet-to-eyelet length, exterior dimensions, and the like. As such, the fitment of the shock assembly will remain the same regardless of whether or not travel spacers are added or removed.

However, as one or more spacers are added to the air piston within the air chamber, the available axial length of the internal air chamber (e.g., the stroke) will be shortened, and the volume of the air in the internal air chamber will be reduced. In one embodiment, the reduced internal air chamber volume could also be used to increase a firmness of the shock assembly.

Conversely, when one or more travel spacers are removed from within the internal air chamber of the air shock, the available axial distance within the internal air chamber will be increased along with the volume of the internal air chamber. This change to the geometry of the internal air chamber will result in an increased stroke, e.g., an increase in the available piston travel range. In addition, in one embodiment, the increase in the internal air chamber volume will reduce the firmness of the shock assembly.

In one embodiment, by utilizing the newly invented method and system to modify the performance of the shock assembly, a number of additional benefits are realized. One benefit is realized by shock assembly manufactures. Although they will still need to manufacture a number of different shock assemblies (or components) due to one or more different external geometries of different shock assemblies; they will not need to include an additional step of modifying (or tuning) the size of the internal air chamber or the range of travel of the shock assembly.

Another benefit is realized by the seller who will be able to stock fewer pre-configured aftermarket (AM) shock assemblies. For example, the seller could stock a number of shock assemblies A that have a first geometry, e.g., each shock assembly A having the same external geometries, e.g., eyelet-to-eyelet length, exterior sizing, range of travel, etc. The seller could also stock a number of shock assemblies B, (designed with one or more different external geometries than the external geometries of shock assembly A) e.g., shock assemblies B having the same external geometries, e.g., eyelet-to-eyelet length, exterior sizing, range of travel, etc.

Moreover, the seller would be able to make aftermarket or custom adjustments to the performance of the shock assembly, by adding (or removing) one or more travel spacers to the internal air chamber prior to shipment. A dealer would similarly be able to make aftermarket or custom adjustments to the performance of the shock assembly, by adding (or removing) one or more travel spacers to the internal air chamber.

Referring now to FIG. 1, is a perspective view of a bicycle 50 having a user accessible shock travel spacer integrated with at least one shock assembly is shown in accordance with an embodiment. Although a bicycle is used in the discussion. In one embodiment, the shock assembly could be used on another vehicle such as, but not limited to a road bike, a mountain bike, a gravel bike, an electric bike (e-bike), a hybrid bike, a scooter, a motorcycle, an ATV, a personal water craft (PWC), a four-wheeled vehicle, a snow mobile, a UTV such as a side-by-side, and the like. Thus, between the disclosed examples as provided in view of a bicycle, the disclosed embodiment for implementing the user accessible shock travel spacer on a shock assembly can be used on shock assemblies used by vehicles with wheels, skis, tracks, hulls, and the like. As such, it should be appreciated that the disclosed examples and embodiment for modifying a shock assembly, would be similar to performing the shock assembly modifications on a different vehicle.

Referring again to FIG. 1, In one embodiment, bicycle 50 has a main frame 24 with a suspension system comprising a swing arm 26 that, in use, is able to move relative to the rest of main frame 24; this movement is permitted by, inter alia, rear shock assembly 38. The front fork assembly 34 also provide a suspension function via a front shock assembly 35 in at least one fork leg. In one embodiment, at least one valve in the shock assembly is an active valve (such as active valve 450 discussed herein).

In one embodiment, bicycle 50 is a full suspension bicycle. In another embodiment, bicycle 50 has only a front shock assembly 35 and no rear shock assembly 38 (e.g., a hard tail). In yet another embodiment, bicycle 50 could have a saddle 32 or seatpost 33 suspension (e.g., a dropper post, shock assembly within seatpost 33, etc.). In one embodiment, bicycle 50 could have a combination of at least two different suspension components such as, for example, front shock assembly 35, rear shock assembly 38, a saddle 32 or seatpost 33 suspension, etc. Moreover, bicycle 50 could be a road bike, a mountain bike, a gravel bike, an electric bike (e-bike), a hybrid bike, a motorcycle, a scooter, or the like.

In one embodiment, swing arm 26 is pivotally attached to the main frame 24 at pivot point 12. Although pivot point 12 is shown in a specific location, it should be appreciated that pivot point 12 can be found at a different location depending upon the rear suspension configuration. The use of the pivot point 12 herein is provided merely for purposes of clarity.

For example, in a hardtail bicycle embodiment, there would be no pivot point 12. In one embodiment of a hardtail bicycle, main frame 24 and swing arm 26 would be formed as a fixed frame.

Bicycle 50 includes a front wheel 28 which is coupled with the front fork assembly 34 via axle 85. In one embodiment, a portion of front fork assembly 34 (e.g., a steerer tube) passes through the bicycle main frame 24 and couples with handlebar assembly 36. In so doing, the front fork assembly and handlebars are rotationally coupled with the main frame 24 thereby allowing the rider to steer the bicycle 50.

Bicycle 50 includes a rear wheel 30 which is coupled to the swing arm 26 at rear axle 15. A rear shock assembly 38 is positioned between the swing arm 26 and the frame 22 to provide resistance to the pivoting motion of the swing arm 26 about pivot point 12. Thus, the illustrated bicycle 50 includes a suspension member between swing arm 26 and the main frame 24 which operate to substantially reduce rear wheel 30 impact forces from being transmitted to the rider of the bicycle 50.

In one embodiment, saddle 32 is connected to the main frame 24 via seatpost 33. In one embodiment, seatpost 33 is a dropper seatpost. In one embodiment, front shock assembly 35, rear shock assembly 38, seatpost 33, handlebar assembly 36, and/or the like include one or more active and/or semi-active damping components such as, or similar to, the active valve 450 discussed herein.

In one embodiment, bicycle 50 includes a suspension controller system including a controller, power source, and one or more sensors such as described in U.S. Pat. Nos. 7,484,603; 8,838,335; 8,955,653; 9,303,712; 10,060,499; 10,443,671; and 10,737,546; each of which is herein incorporated, in its entirety, by reference.

Figure 2A:
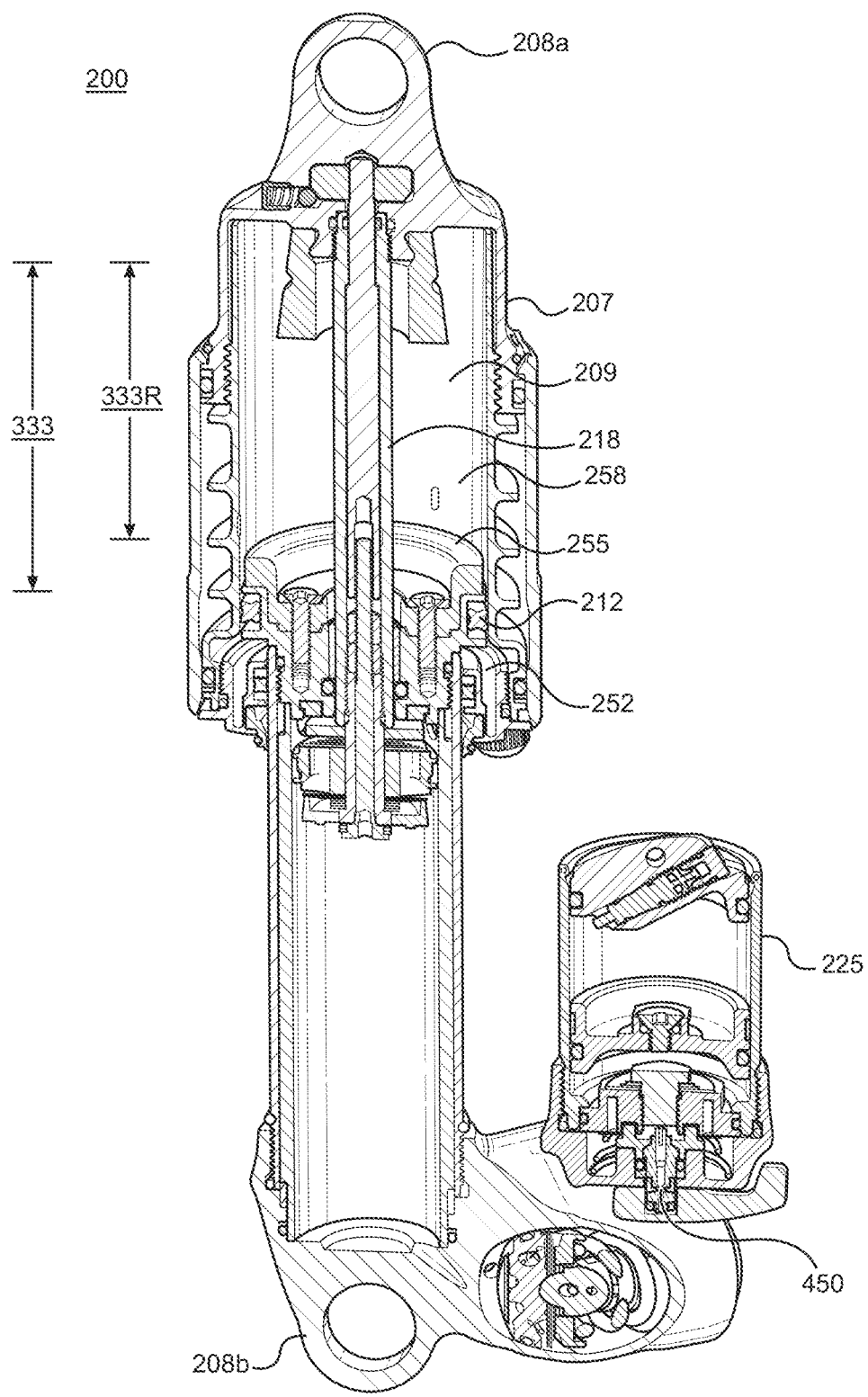
FIG. 2A is a section view of an air-type shock assembly with a travel spacer assembly incorporated therewith, in accordance with an embodiment.

FIG. 2A is a section view of an air-type shock assembly 200 with a travel spacer assembly 255 incorporated therewith is shown in accordance with an embodiment. In one embodiment, air-type shock assembly 200 can be front shock assembly 35 and/or rear shock assembly 38 of FIG. 1.

In one embodiment, air-type shock assembly 200 includes eyelets 208a and 208b (e.g., eyelets 208), an air shock including air piston 212, shaft 218 (in one embodiment, a rebound needle shaft), air sleeve 207 which forms the air chamber 209, and a piggyback reservoir 225, and an active valve 450.

In one embodiment, an eyelet-to-eyelet measurement is used to determine the total length of the air-type shock assembly 200, as measured from the center of each of eyelets 208, e.g., the distance between the center of eyelet 208a and the center of eyelet 208b.

Figure 3A:
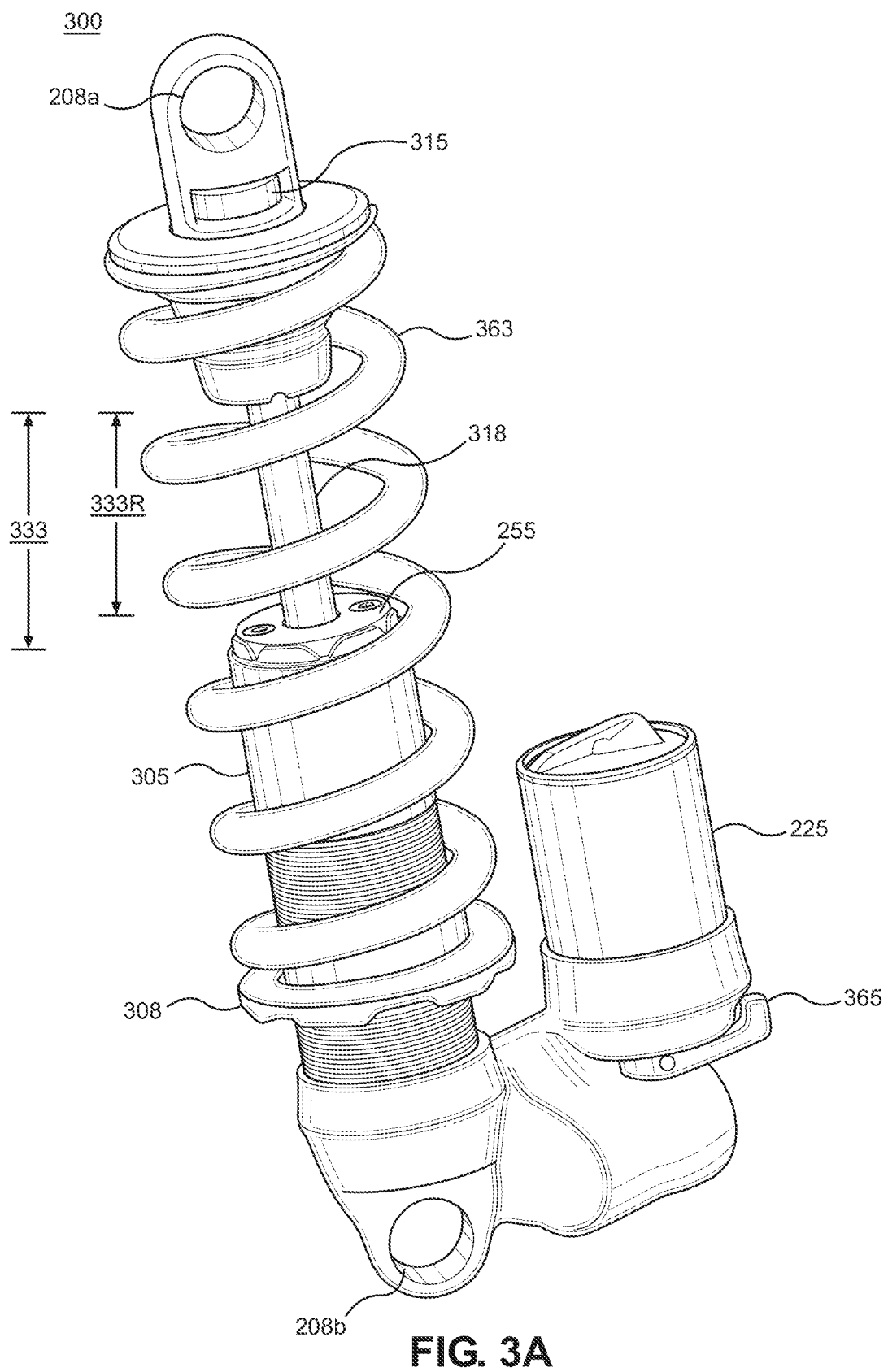
FIG. 3A is a perspective view of a shock assembly including a piggyback reservoir and an active valve, in accordance with an embodiment.

In one embodiment, the stroke is a measurement of the total distance the shock assembly can compresses. In air-type shock assembly 200, it is defined by the length of travel available to the air piston 212. In a fluid-type shock assembly 300 (hereinafter "shock assembly 300" as shown in FIG. 3A), stroke length is the difference between the measured length of the shock assembly 300 in a fully extended position and measured length of shock assembly 300 in a fully compressed position.

In one embodiment, the as built stroke length for air-type shock assembly 200 is shown as stroke length 333. In one embodiment, travel spacer assembly 255 is added to the air-type shock assembly 200 on the positive air chamber side 258 of air chamber 209, e.g., the side of air piston 212 facing toward eyelet 208a. In so doing, travel spacer assembly 255 has shortened the available length of travel in air chamber 209 to the new shorter stroke length 333R.

Figure 2B:
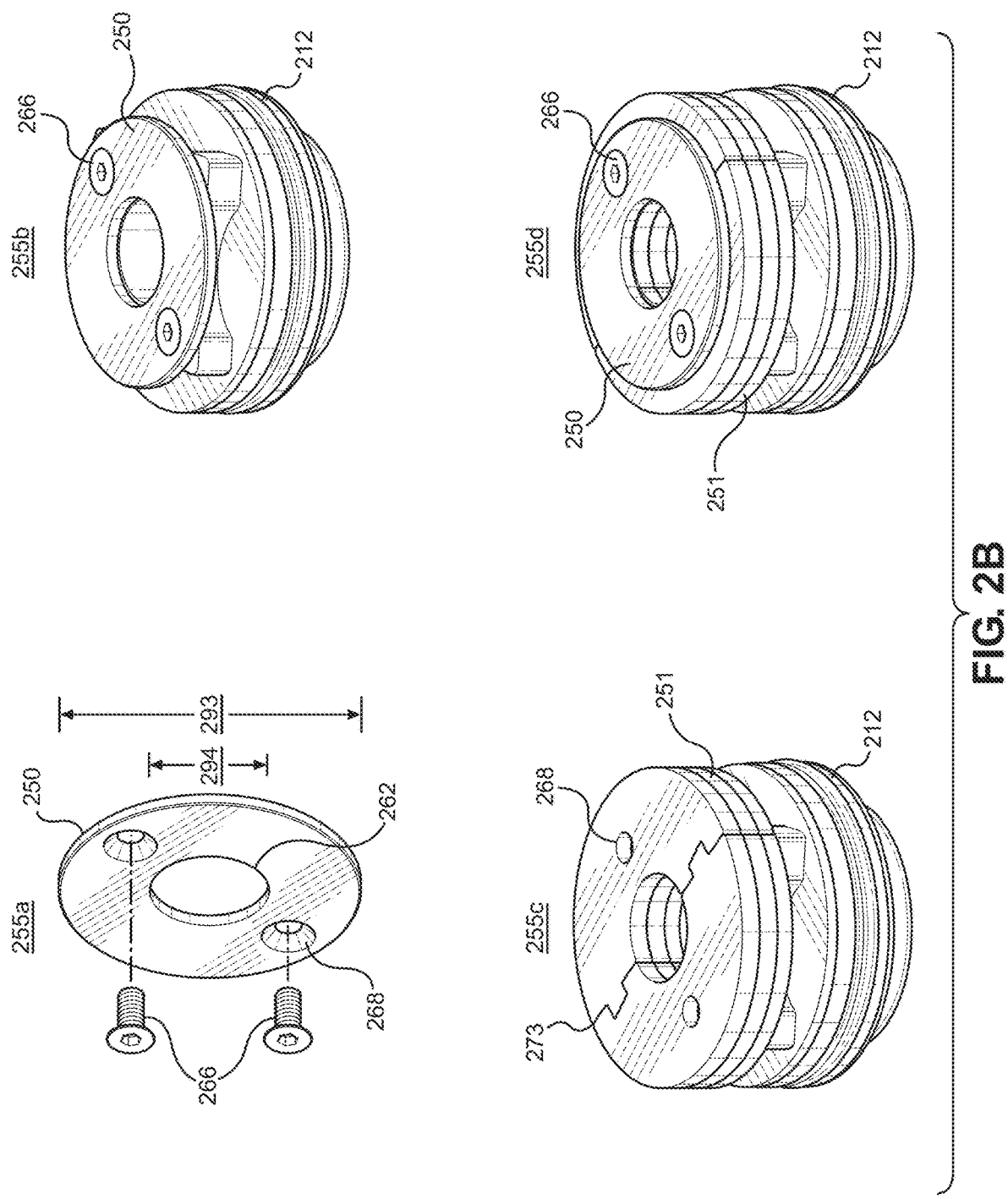
FIG. 2B is a perspective view of different configurations of the travel spacer assembly, in accordance with an embodiment.

Referring now to FIG. 2B, a perspective view of a number of different configurations of traveler spacer assembly 255 are shown in accordance with an embodiment. The different configurations of travel spacer assemblies are labeled 255a, 255b, 255c, and 255d.

In one embodiment, travel spacer assembly 255a includes a retaining cap 250 having an outer diameter (OD) 293, opening 262 having a diameter 294, fastener(s) 266, and attachment hole(s) 268.

Travel spacer assembly 255b is an embodiment of travel spacer assembly 255a coupled to air piston 212 by fastener 266.

Travel spacer assembly 255c is an embodiment that includes a number of different travel spacers 251 having an attachment hole 268 and a seam or dividing line 273. As shown in Further detail in FIG. 2D, the travel spacer(s) 251 are formed of at least two pieces 251a and 251b such that the travel spacer 251 can be installed in position about air piston 212 to form travel spacer assembly 255c without requiring disassembly of the shock assembly. In one embodiment, the travel spacers 251 are retained by retaining cap 250 and fastener 266 as shown in travel spacer assembly 255d.

In other words, after positioning the sections of one or more travel spacers 251 about shaft 218 the travel spacer sections can be coupled together to form travel spacer 251. In one embodiment, travel spacer(s) 251 include an attachment hole 268 therethrough, such that travel spacer 251 is coupled with air piston 212 via retaining cap 250 and fasteners 266. In one embodiment, (as shown in detail in FIG. 2E) travel spacer 251 does not require an attachment hole 268 and is coupled with shaft 218 via one or more fasteners such as a clip, hook, snap, or the like.

In one embodiment, the geometry of the travel spacer 251 resembles a clamshell or a multipiece circular disk. That is, the travel spacer 251 geometry is a semicircular portion of a flat circular disk divided as shown in dividing line 273. For example, in the circular disk travel spacer 251 geometry, without the dividing line 273 (or similar) cutting the travel spacer in half to form two semicircles, the installation of travel spacer 251 would require placing it over the shaft 218 before attaching it to air piston 212. However, if the travel spacer 251 is halved, then the travel spacer can be inserted around the shaft 218. Once each travel spacer 251 is inserted, the travel spacer assembly 255a can be attached to the air piston 212.

In yet another embodiment, the travel spacer 251 could be of any geometric shape as long as it remains within the defined tolerances. For example, if the travel spacer 251 is of a flat semicircular geometry and it is being used to reduce the stroke and displacing as large an amount of air as possible from air chamber 209, the geometry of the travel spacer 251 would be as wide as the tolerance limits allowed. E.g., using the measurement from the above example, the travel spacer 251 would have an OD 283 of approximately 39.9 mm and the diameter 294 of the opening 262 would be approximately 10.1 mm.

In contrast, if the travel spacer 251 is of a flat semicircular geometry and it is being used to reduce the stroke while displacing as little an amount of air as possible from air chamber 209, the geometry of the travel spacer 251 would be as narrow as the tolerance limits allowed. E.g., using the measurement from the above example, the travel spacer 251 would have an OD 283 of approximately 15 mm (or some value less than 39.9 mm) and the diameter 294 of the opening 262 would be approximately 10.1 mm. In one embodiment, the OD 283 would be constrained by the smallest OD size that would still allow the attachment holes 268 for the fasteners 266. As such, the length of stroke would be reduced while the loss of air volume in air chamber 209 would be minimized.

In one embodiment, the pieces 251a and 251b of the travel spacer would be placed around the shaft 218 and fastened in place by a fastener 277 such as a clip, hook snap, or the like such that there would be no attachment holes 268 in the travel spacer assembly 255. Thus, in one embodiment, retaining cap 250 of the travel spacer assembly 255 and its fasteners 266 would not be used to retain the travel spacer assembly 255. As such, in one embodiment, the OD 283 would not be constrained by the smallest OD size that would still allow the attachment holes 268 for the fasteners 266 since the travel spacer assembly 255 would not require attachment holes 268 to retain the travel spacer with respect to the shaft 218.

In yet another embodiment, the travel spacer 251 geometry could be of a different geometric shape such as a half star, half oval, half crosshatch, or the like, such that similar to the examples above. In one embodiment, different travel spacer 251 geometries can be used to adjust the amount of air displaced from air chamber 209 between the maximum possible amount and the minimum possible amount for a given travel spacer assembly 255 thickness needed to achieve the correct stroke length reduction. In one embodiment, the ability to change the air volume in air chamber 19 independent of the adjustment to the stroke length will allow additional tuning changes to the operational characteristics of air-type shock assembly 200.

Figure 2C:
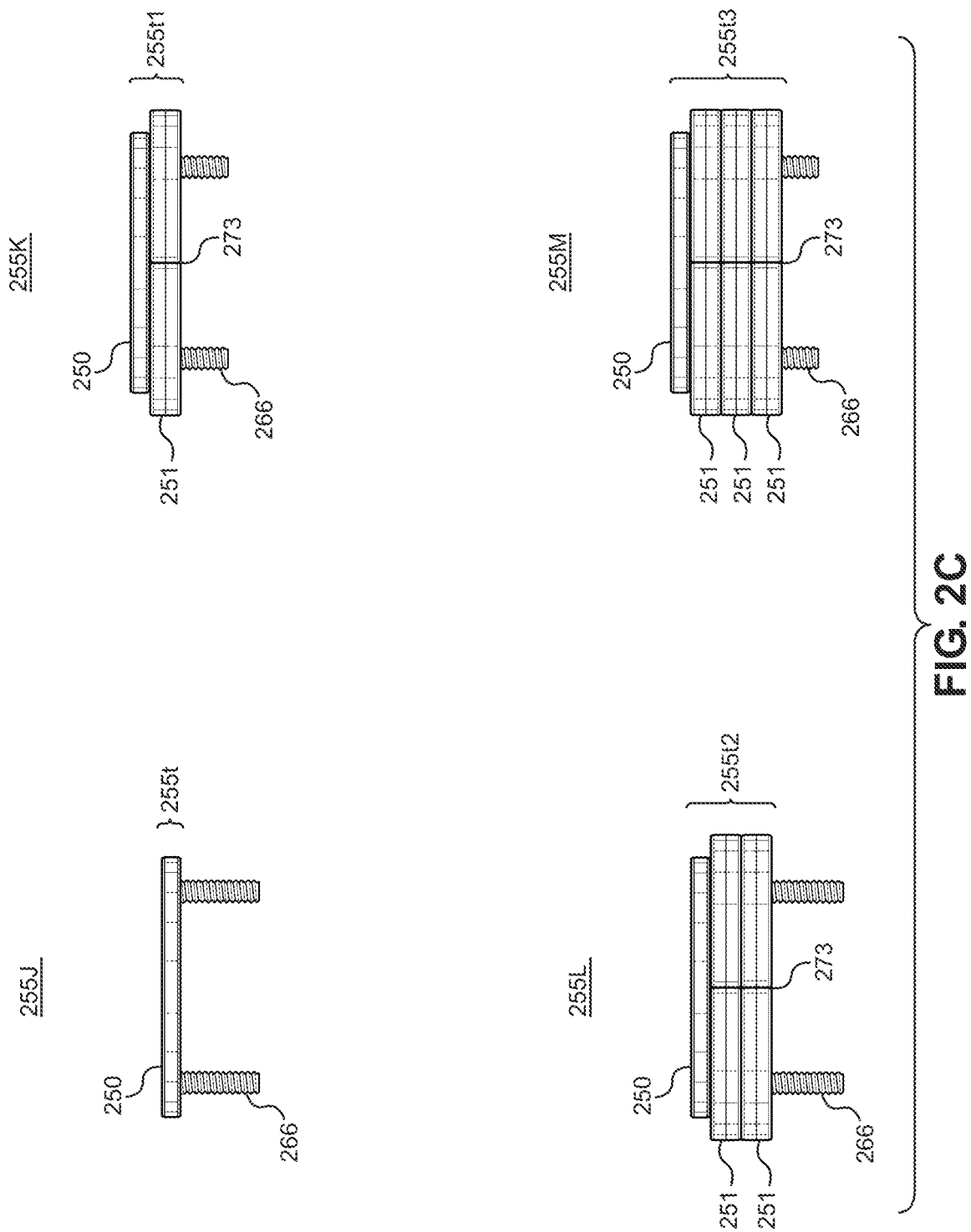
FIG. 2C is a side view of the different configurations of the travel spacer assembly, and an exploded view of a travel spacer assembly, in accordance with an embodiment.

Referring now to FIG. 2C, a side view of a number of different sizing configurations of the travel spacer assemblies are shown in accordance with an embodiment. In FIG. 2C, the number of example embodiments of different sizing configurations for travel spacer assembly 255 are labeled travel spacer assembly 255J, travel spacer assembly 255K, travel spacer assembly 255L, and travel spacer assembly 255M.

In one embodiment, travel spacer assembly 255J consists only of the retaining cap 250 and the fasteners 266. In one embodiment, travel spacer assembly 255J is formed during the manufacturing or assembly process. As shown in the exploded view of FIG. 2D, in one embodiment, retaining cap 250 is a complete circle that is installed during a point of assembly (or disassembly) of air-type shock assembly 200 (or shock assembly 300) such that retaining cap 250 is inserted over shaft 218 (or shaft 318) and fastened with the air piston 212 (or respectively housing 305) before the shock assembly is completely assembled. In one embodiment, travel spacer assembly 255J has a thickness of 255t which is the thickness of the retaining cap 250.

In one embodiment, travel spacer assembly 255K is an example of a travel spacer assembly including a retaining cap 250 (which in one embodiment has a thickness of 0.5 mm), fasteners 266, and a single travel spacer 251 (which in one embodiment has a thickness of 2 mm), retaining cap 250. In one embodiment, travel spacer assembly 255J has a thickness of 255t1 which is the thickness of the retaining cap 250 and the single travel spacer 251. Thus, in one embodiment, travel spacer assembly 255K is an example of a 2.5 mm stroke reduction.

In one embodiment, travel spacer assembly 255L includes retaining cap 250, fasteners 266, and two travel spacers 251. In one embodiment, travel spacer assembly 255J has a thickness of 255t2 which is the thickness of the retaining cap 250, a first travel spacer 251 (which in one embodiment has a thickness of 2 mm), and a second travel spacer 251 (which in one embodiment has a thickness of 2.5 mm). Thus, in one embodiment, travel spacer assembly 255K is an example of a 5 mm stroke reduction.

In one embodiment, travel spacer assembly 255M includes retaining cap 250, fasteners 266, and three travel spacers 251. In one embodiment, travel spacer assembly 255J has a thickness of 255t3 which is the thickness of the retaining cap 250, a first travel spacer 251 (which in one embodiment has a thickness of 2 mm), a second travel spacer 251 (which in one embodiment has a thickness of 2.5 mm), and a third travel spacer 251 (which in one embodiment has a thickness of 2 mm). Thus, in one embodiment, travel spacer assembly 255M is an example of a 7 mm stroke reduction.

In one embodiment, a metric size shock assembly will have a base stroke size (e.g., stroke length 333) of, in one example, 65 mm of travel. Moreover, it is common for original equipment manufacturers (OEMs) to sell the air-type shock assembly 200 with a stroke spec that is the full size (e.g., 65 mm), or they will sell the air-type shock assembly 200 with a reduced stroke length 333R which is often incrementally spaced down by distances such as, but not limited to, 2, 2.5, 5, or 7.5 mm. Thus, in one embodiment, different travel spacers can be of different thicknesses (e.g., 2, 2.5, 5, and 7.5 mm) as shown in FIG. 2C and described herein. In so doing, the use of the addable travel spacer assembly 255 in place of manufacturer added internal spacers, will reduce the overall manufacturing process while allowing the OEM, seller, dealer, or rider, to achieve the reduced stroke length 333R by replacing the previously manufacture added spacers with a similarly sized travel spacer assembly 255 that can be installed without complete disassembly of the shock assembly 200.

In one embodiment, although a few different travel spacer assemblies with different thicknesses are shown in FIG. 2C and described herein, it should be appreciated that one or more travel spacer 251 thickness options could include any number of different thicknesses.

Figure 2D:
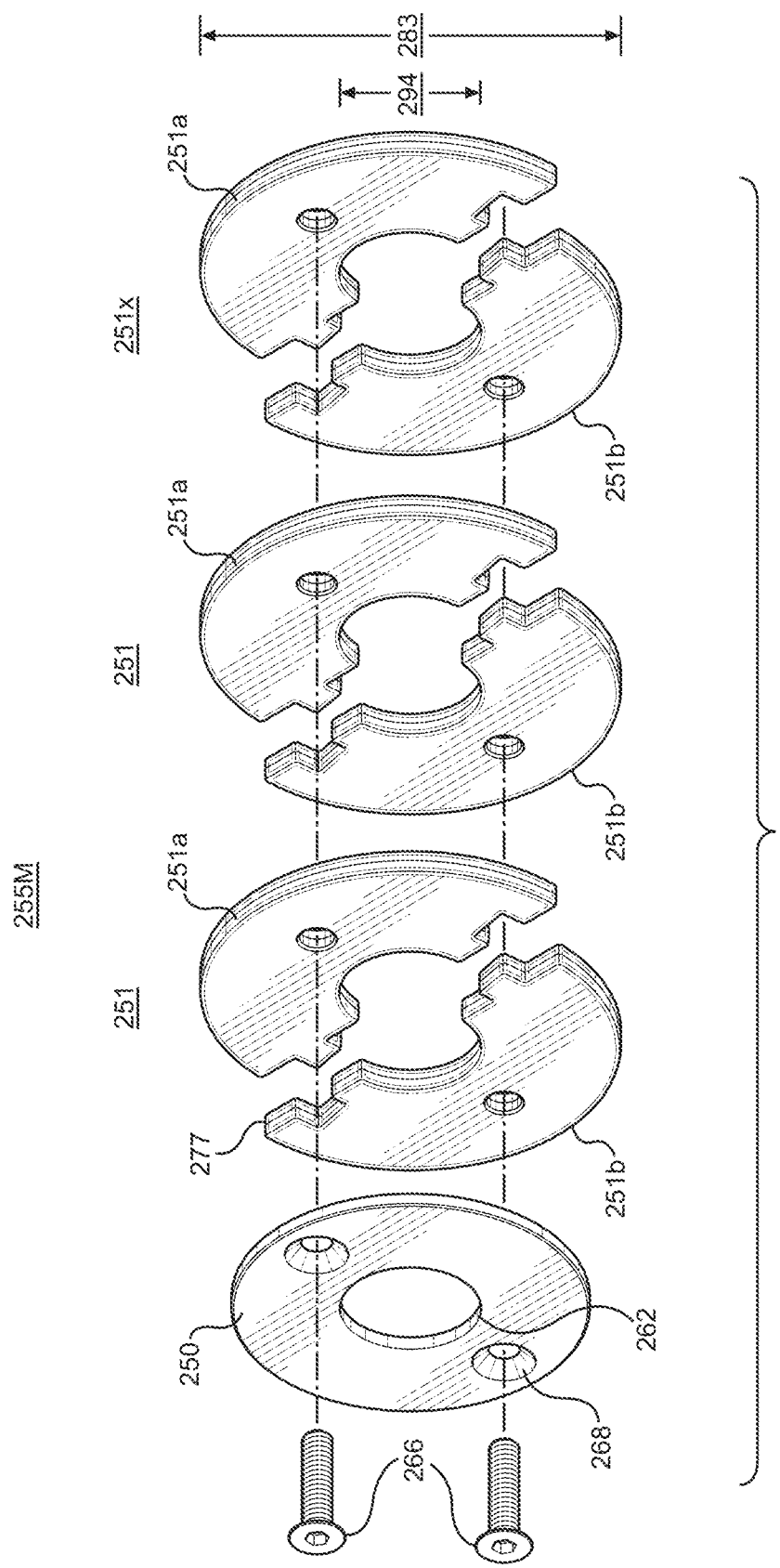
FIG. 2D is an exploded view of travel spacer assembly, shown in accordance with an embodiment.

Referring now to FIG. 2D, an exploded view of a travel spacer assembly (such as travel spacer assembly 255M of FIG. 2C) is shown in accordance with an embodiment. In one embodiment, exploded view of travel spacer assembly 255M includes fasteners 266, attachment holes 268, retaining cap 250, and three travel spacers where travel spacer 251x is a different thickness (e.g., 2 mm) than at least one of the other travel spacers (e.g., 2.5 mm of travel spacer 251). However, it should be appreciated that in different embodiments, one or more of the travel spacers 251 in the travel spacer assembly could be of similar and/or different sizes, geometries, thicknesses and the like.

In one embodiment, as shown in exploded view of travel spacer assembly 255M, the travel spacer 251 consists of two or more pieces (e.g., 251a and 251b) that can be assembled to form a single travel spacer 251. This is important for different geometries and also for ease of insertion or removal of the travel spacer 251 into the travel spacer assembly 255. For example, the travel spacer pieces 251a and 251b can be placed in the appropriate position around shaft 218 (or shaft 318 of FIG. 3A) without requiring disassembly of the shock assembly.

For example, in one embodiment, the fasteners 266 are removed and retaining cap 250 is raised up to provide room for the travel spacer 251. In one embodiment, once the pieces of the travel spacer 251 are placed in the appropriate position around shaft 218 they will reconnect to form a complete travel spacer 251 (or travel spacer layer). Once the desired number of travel spacer(s) 251 have been added to travel spacer assembly 255M, the retaining cap 250 is moved back into position and fasteners 266 are used to couple retaining cap 250 and travel spacer(s) 251 into position. In one embodiment, the fasteners 266 couple travel spacer assembly 255M, with air piston 212. In one embodiment, as shown in FIG. 3A, the fasteners 266 couple travel spacer assembly 255M, with housing 305.

In one embodiment, the size of the travel spacer 251 geometry is constrained by a number of tolerance limitations. For example, in one embodiment, the OD 283 of the travel spacer 251 must be smaller than the inner diameter (ID) of the air chamber 209 into which the travel spacer 251 is being added. For example, if the ID of the air chamber is 40 millimeters (mm), then, the OD 283 of the travel spacer 251 would need to be less than 40 mm.

In one embodiment, a tolerance of the retaining cap 250 and travel spacer 251 geometry is the diameter 294 of an opening 262 therethrough. In one embodiment, the diameter 294 of the opening 262 of the retaining cap 250 and the travel spacer(s) 251 is larger than the OD of the shaft 218 in the air shock to which it is being added. For example, if the rebound needle shaft 218 has an OD of 10 mm, then the diameter 294 of the opening 262 of the retaining cap 250 and travel spacer 251 would need to be larger than 10 mm. In one embodiment, opening 262 is approximately central to the geometry of retaining cap 250 and/or travel spacer 251.

In one embodiment, the travel spacer 251 also includes one or more attachment holes 268 therethrough. In one embodiment, one or more fasteners 266 are inserted into the attachment holes 268 to fixedly couple the travel spacer assembly 255M with the air piston 212 to ensure the travel spacer 251 is not able to move freely about within air chamber 209. In one embodiment the fasteners 266 are screws. However, in one embodiment, the fasteners 266 could be a clip, bolt, or the like.

In one embodiment, as shown in FIG. 2E, the adjustment to air-type shock assembly 200 would use the addition of self-fastening travel spacer 251 to the negative air chamber portion 252. For example, a travel spacer 251 could also be added to the air-type shock assembly 200 at negative air chamber portion 252 of air chamber 209, e.g., the portion of air chamber 209 that is below air piston 212. By adding one or more travel spacers 251 to negative air chamber portion 252, air sleeve 207 would be moved further into air chamber 209. This movement would decrease both the stroke length and the eye-to-eye length of air-type shock assembly 200.

In one embodiment, the pieces 251a and 251b of the travel spacer 251 would be placed around the shaft 218 and fastened in place by a fastener such as a clip, hook snap, or the like such that there would be no attachment holes 268 in the travel spacer 251. Thus, in one embodiment, fasteners 266 of the travel spacer assembly 255 would not be used to retain the travel spacer assembly 255.

In one embodiment, travel spacer assembly 255 could be used in both the negative air chamber portion 252 and positive air chamber side 258 to provide an additional level of user accessible custom adjustments to the performance and geometry of the air-type shock assembly 200.

Referring once again to FIG. 2A, in one embodiment, a travel spacer assembly 255 can include one or more travel spacers, and the reduced stroke length 333R and associated air volume displacement for a given travel spacer assembly 255 is adjustable based on one or more features such as, the number and thickness of travel spacer(s) 251, one or a mixture of travel spacer 251 geometries, one or a mixture of travel spacer 251 thicknesses, one or a mixture of travel spacer 251 compositions, and the like.

In one embodiment, because of the relatively easy access to air chamber 209 (e.g., by removing air sleeve 207—which is already done for cleaning purposes) the ability to add or remove a travel spacer assembly 255 or one or more travel spacers 251 from travel spacer assembly 255, can be performed without having to rebleed or charge the air-type shock assembly 200. As such, a manufacturer, original equipment (OE) seller, end user, bike shop, service center, or the like, is able to perform the insertion (removal or replacement) of one or more travel spacers 251 to modify the performance of the air-type shock assembly 200 to include increasing or decreasing the stroke length.

In one embodiment, the travel spacer assembly 255 can be modified, or reconfigured, after it has been installed on air piston 212 to further tune or modify the performance of the air-type shock assembly 200. For example, if the installed travel spacer assembly 255 has made the air-type shock assembly 200 to firm (or soft), or the stoke too short (or long); an addition, removal, or replacement of one or more travel spacers 251 from the travel spacer assembly 255 can be performed by a user, a friend, a dealer, a shop, or the like. By providing user access to the travel spacer assembly 255, the addition, removal, and replacement, of travel spacers 215 to/from the travel spacer assembly 255 (and in one embodiment, in conjunction with different travel spacer 251 geometry options) will allow the end user to experiment with and ultimately arrive at a customized stroke length for the air-type shock assembly 200.

Referring now to FIG. 3A, a perspective view of a shock assembly 300 including eyelet 208a and eyelet 208b, a housing 305, a piggyback reservoir 225, helical spring 363, and a manual compression adjuster 365 is shown in accordance with an embodiment. In one embodiment, shock assembly 300 also includes a preload adjustment collar 308, rebound adjuster 315, and shaft 318. In one embodiment, shock assembly 300 may be a front shock assembly 35 and/or rear shock assembly 38 of FIG. 1.

In one embodiment, the as built stroke length 333 is shown. In one embodiment, travel spacer assembly 255 has been added to about shaft 318 and coupled to housing 305 and in so doing has changed the stroke to the new shorter stroke length 333R.

In one embodiment, piggyback reservoir 225, is described in U.S. Pat. No. 7,374,028 the content of which is entirely incorporated herein by reference.

Figure 3B:
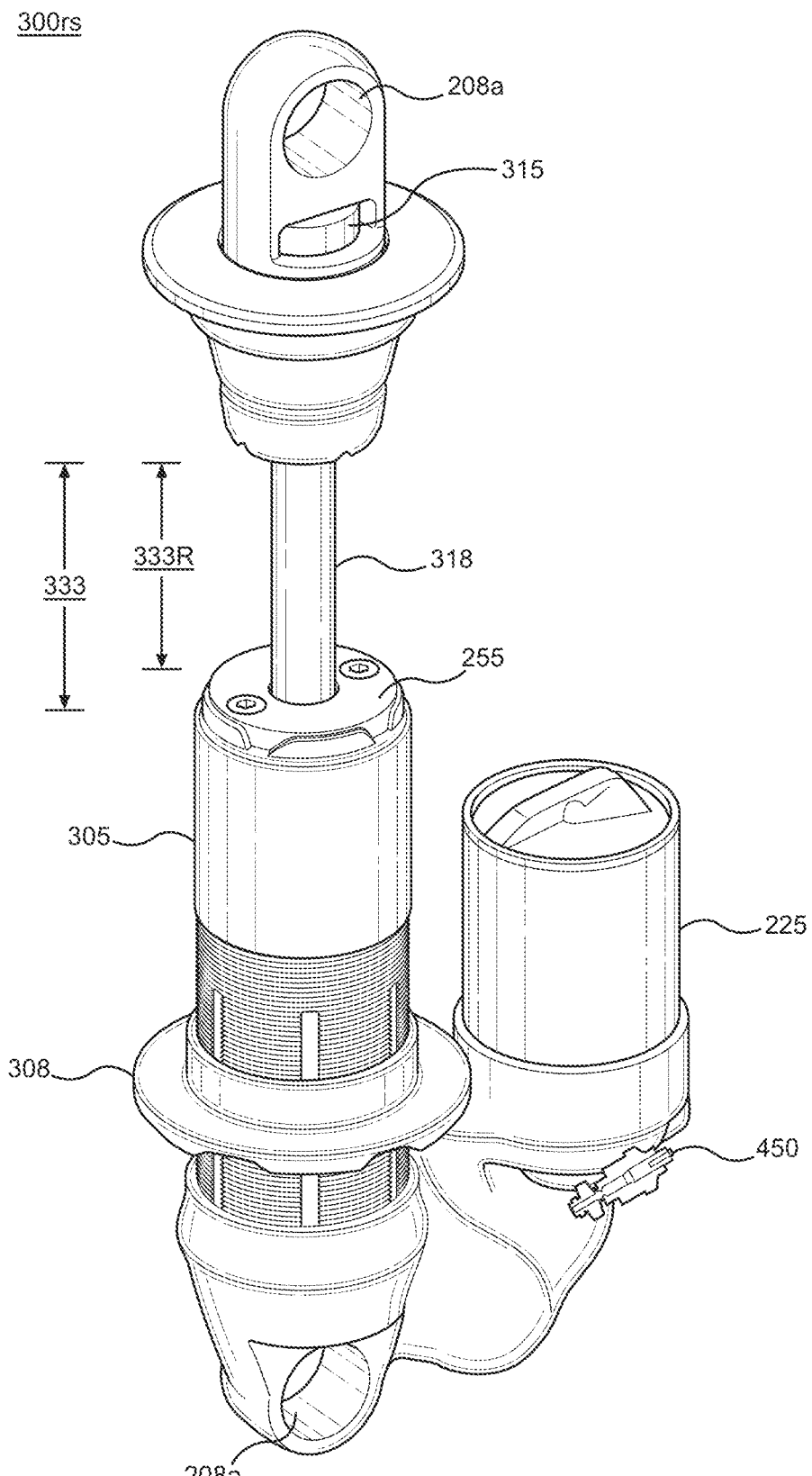
FIG. 3B is a perspective view of a shock assembly including a piggyback reservoir, a manual compression adjuster, and a helical spring, in accordance with an embodiment.

With reference now to FIG. 3B, a perspective view of a shock assembly 300rs including eyelet 208a and eyelet 208b, a housing 305, a piggyback reservoir 225, and an active valve 450 is shown in accordance with an embodiment. In one embodiment, shock assembly 300rs can be a front shock assembly 35 and/or rear shock assembly 38 of FIG. 1.

In one embodiment, shock assembly 300rs includes a preload adjustment collar 308, rebound adjuster 315, and shaft 318 such as shown in shock assembly 300 of FIG. 3A. However, in FIG. 3B and for purposes of clarity, the helical spring 363 has been removed from the picture. Thus, FIG. 3B is the same or similar to shock assembly 300 but it is labeled shock assembly 300rs because the helical spring 363 is not shown for clarity.

In one embodiment, the as built stroke length 333 is shown. In one embodiment, when travel spacer assembly 255 is added about shaft 318 and coupled with housing 305, the stroke length is changed to the new shorter stroke length 333R. As described herein with respect to FIGS. 2B and 2C, although a travel spacer assembly 255 is shown with only a retaining cap 250, the travel spacer assembly 255 used on shock assembly 300 (and shock assembly 300rs) could include any version of the numerous travel spacer geometries, travel spacer assemblies, and the like such as, but not limited to those shown in FIGS. 2C-2E.

In FIGS. 3A and 3B, the addition of the travel spacer assembly 255 does not change any volumes of any chambers; However, it's ease of accessibility and numerous configurations once again allow a repair shop, end user, and the like with the ability to experiment and individually customize the stroke length of the shock assembly 300.

In one embodiment, due to the relative ease of adding and/or removing travel spacer(s) 251 to change the size of travel spacer assembly 255 (and thus the stroke length), it is possible that a rider could develop a number of different travel spacer assembly 255 configurations for different riding environments. For example, the rider could develop a first customized travel spacer assembly 255 for a downhill cross-country ride having a first thickness, a second different customized travel spacer assembly 255 for a gravel ride having a second thickness, a third customized travel spacer assembly 255 for a road ride having a third thickness, etc.

Figure 3C:
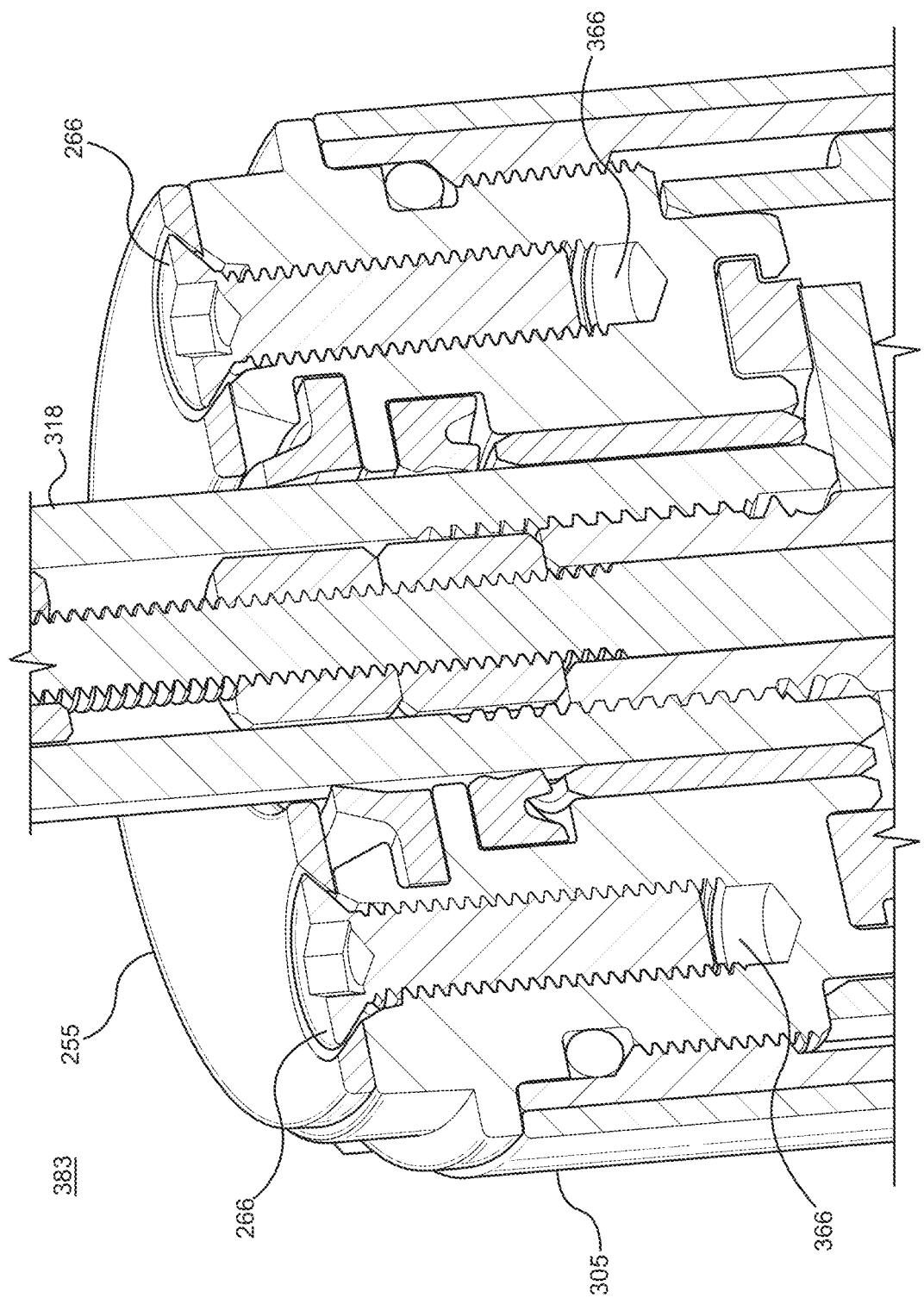
FIG. 3C is a sectional view of a portion of the shock assembly of FIGS. 3A and 3B showing the attachment of the travel spacer assembly to the shock assembly housing, in accordance with an embodiment.

Referring now to FIG. 3C, a front sectional detail view 383 of a portion of shock assembly 300 of FIG. 3A is shown in accordance with an embodiment.

In detail view 383, one embodiment for coupling the travel spacer assembly 255 to the housing 305 is shown. In one embodiment, travel spacer assembly 255 includes retaining cap and fasteners 266. In one embodiment, the retaining cap is placed into its position about shaft 318 during manufacture. In one embodiment, the fasteners 266 are then inserted into attachment holes 268 of the retaining cap and threaded into correlating fastener retaining holes 366, formed in the housing 305. The fasteners 266 are threaded into fastener retaining holes 366 until the travel spacer assembly 255 is securely coupled with the housing 305 about the shaft 318.

In one embodiment, if a customer, manufacturer, repair shop, or the like wants to change the stroke length of the shock assembly 300, they can add one or more travel spacer(s) 251 thereto. In one embodiment, (as shown in FIG. 2D) the travel spacer 251 consists of two or more pieces (e.g., 251a and 251b) that can be assembled to form a single travel spacer 251. This is important for different geometries and also for ease of insertion or removal of the travel spacer 251 into the travel spacer assembly 255. For example, the travel spacer pieces 251a and 251b can be placed in the appropriate position around shaft 318 without requiring disassembly of the shock assembly 300.

For example, in one embodiment, the fasteners 266 are removed and retaining cap 250 is raised up to provide room for the travel spacer 251. In one embodiment, once the pieces 251a and 251b of the travel spacer 251 are placed in the appropriate position around shaft 318 they will reconnect to form a complete travel spacer 251 (or travel spacer layer). Once the desired number of travel spacer(s) 251 have been added to travel spacer assembly 255 to obtain the thickness of the desired reduction in stroke length, the retaining cap 250 is moved back into position and fasteners 266 are used to couple retaining cap 250 and travel spacer(s) 251 with housing 305.

In one embodiment, instead of a retaining cap, travel spacer assembly 255 includes a travel spacer and fasteners 266. As such, the travel spacer 251 can be placed into position about shaft 318 after the manufacturing and assembly process of shock assembly 300 is performed and without having to disassemble shock assembly 300. In one embodiment, the missing side of the sectional view would include another clamshell shaped portion of the travel spacer positioned about shaft 318. In one embodiment, once the travel spacer pieces are united, the fasteners 266 are then inserted into attachment holes 268 and threaded into correlating fastener retaining holes 366, formed in the housing 305 until the travel spacer assembly 255 is securely coupled with the housing 305 about the shaft 318.

In one embodiment, the travel spacer assembly 255 geometry is constrained by a number of tolerance limitations. For example, in one embodiment, the OD 283 of the travel spacer assembly 255 must be smaller than the inner diameter (ID) of the helical spring 363 within which the travel spacer is being added. For example, if the ID of the helical spring 363 is 35 mm, then, the OD 283 of the travel spacer 251 would need to be less than 35 mm.

In one embodiment, a tolerance of the retaining cap 250 and travel spacer 251 geometry (e.g., travel spacer assembly 255) is the diameter 294 of an opening 262 therethrough. In one embodiment, the diameter 294 of the opening 262 of the travel spacer assembly 255 is larger than the OD of shaft 318 of the shock assembly 300 to which it is being added. For example, if the shaft 318 has an OD of 12 mm, then the diameter 294 of the opening 262 of the travel spacer assembly 255 would need to be larger than 12 mm. In one embodiment, opening 262 is approximately central to the geometry of travel spacer assembly 255.

In one embodiment, the travel spacer assembly 255 can be modified, or reconfigured, after it has been installed on shock assembly 300 to further tune or modify the performance thereof. For example, if the installed travel spacer assembly 255 has made shock assembly 300 too firm (or too soft), or the stoke too short (or too long); an addition, removal, or replacement of one or more travel spacers 251 from the travel spacer assembly 255 can be performed by a user, a friend, a dealer, a shop, or the like. By providing user access to the travel spacer assembly 255, the addition, removal, and replacement, of travel spacers 215 in the travel spacer assembly 255 (and in one embodiment, in conjunction with different travel spacer 251 geometry options) will allow the end user to experiment with and ultimately customize the stroke of the shock assembly 300.

Example Active Valve

Figure 4:
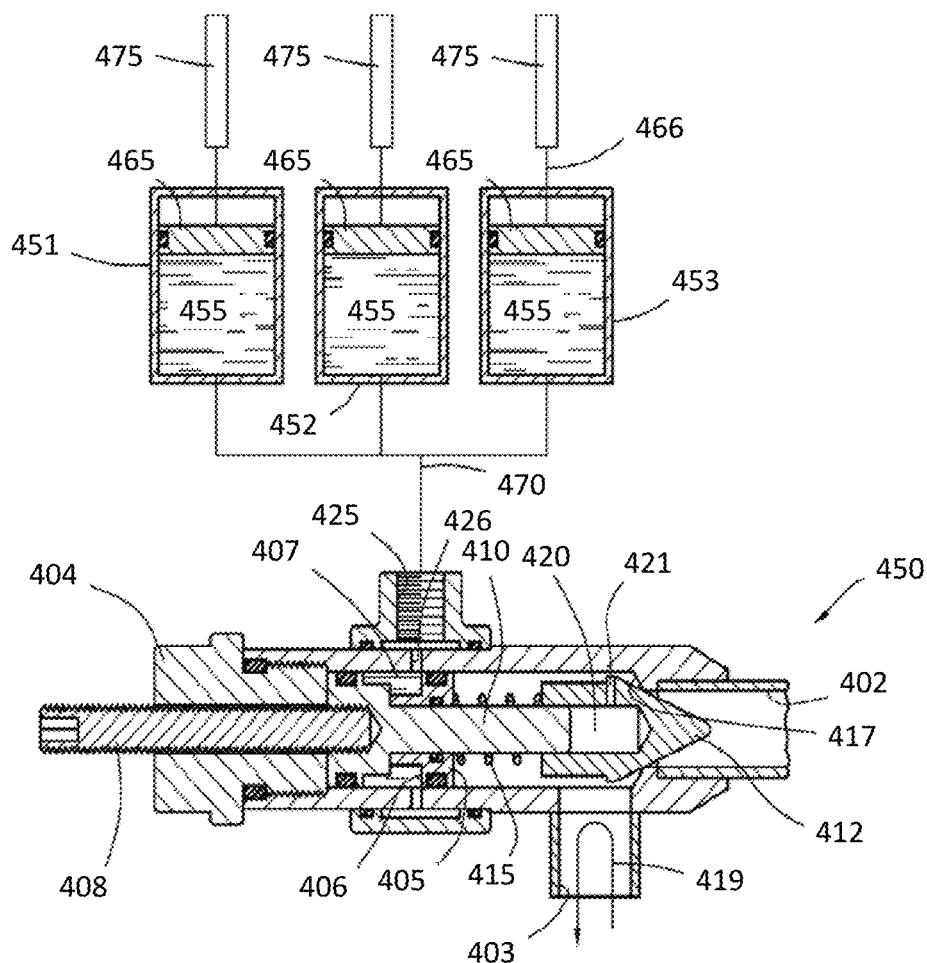
FIG. 4 is an enlarged section view showing an active valve and a plurality of valve operating cylinders in selective communication with an annular piston surface of the valve, in accordance with an embodiment.

Referring now to FIG. 4, an enlarged view of an active valve 450 is shown in accordance with an embodiment.

In the following discussion, the term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used. Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

Although FIG. 4 shows the active valve 450 in a closed position (e.g. during a rebound stroke of the shock assembly), the following discussion also includes the opening of active valve 450. Active valve 450 includes a valve body 404 housing a movable valve piston 405 which is sealed within the body. The valve piston 405 includes a sealed chamber 407 adjacent an annularly-shaped piston surface 406 at a first end thereof. The chamber 407 and annularly-shaped piston surface 406 are in fluid communication with a port 425 accessed via opening 426. Two additional fluid communication points are provided in the body including an inlet (such as orifice 402) and an outlet (such as orifice 403) for fluid passing through the active valve 450.

Extending from a first end of the valve piston 405 is a shaft 410 having a cone shaped member 412 (other shapes such as spherical or flat, with corresponding seats, will also work suitably well) disposed on an end thereof. The cone shaped member 412 is telescopically mounted relative to, and movable on, the shaft 410 and is biased toward an extended position due to a spring 415 coaxially mounted on the shaft 410 between the cone shaped member 412 and the valve piston 405. Due to the spring biasing, the cone shaped member 412 normally seats itself against a valve seat 417 formed in an interior of the valve body 404.

As shown, the cone shaped member 412 is seated against valve seat 417 due to the force of the spring 415 and absent an opposite force from fluid entering the active valve 450 along orifice 402. As cone shaped member 412 telescopes out, a gap 420 is formed between the end of the shaft 410 and an interior of cone shaped member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the valve piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annularly-shaped piston surface 406 is exposed to the fluid.

Because each cylinder has a specific volume of substantially incompressible fluid and because the volume of the sealed chamber 407 adjacent the annularly-shaped piston surface 406 is known, the fluid contents of each cylinder can be used, individually, sequentially or simultaneously to move the piston a specific distance, thereby effecting the shock assembly damping characteristics in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the cone shaped member 412 to urge it backwards, at least partially loading the spring 415 and creating a fluid flow path from the orifice 402 into and through orifice 403.

The characteristics of the spring 415 are typically chosen to permit active valve 450 (e.g. cone shaped member 412) to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression shock assembly (particularly true when a solid piston is also used).

In one embodiment, the valve is open in both directions when the cone shaped member 412 is "topped out" against valve body 404. In another embodiment however, when the valve piston 405 is abutted or "topped out" against valve body 404 the spring 415 and relative dimensions of the active valve 450 still allow for the cone shaped member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing cone shaped member 412 to open, close, or partially close orifice 402) can be applied to one shock assembly or one set of vehicle shock assemblies on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing cone shaped member 412 to open, close, or partially close orifice 402) in response thereto. In another example, active valve 450 is controlled at least in part by a pressure transducer measuring pressure in a vehicle tire. Wherein, the active valve 450 will modify a damping characteristic of the shock assembly for one, some, or all of the shock assemblies (by adjusting the working size of the opening of orifice 402 by causing cone shaped member 412 to open, close, or partially close orifice 402) in the event of, for example, an increased or decreased pressure reading in the vehicle tire.

In one embodiment, active valve 450 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition. Wherein, the active valve 450 will modify a damping characteristic for one, some, or all of the vehicle's shock assemblies (by adjusting the working size of the opening of orifice 402 by causing cone shaped member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the shock assembly, damping occurs as the distance between cone shaped member 412 and orifice 402 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the valve body 404 rotates in a reverse direction than that described above and herein, the cone shaped member 412 moves away from orifice 402 providing at least a partially opened fluid path.

Figure 5:
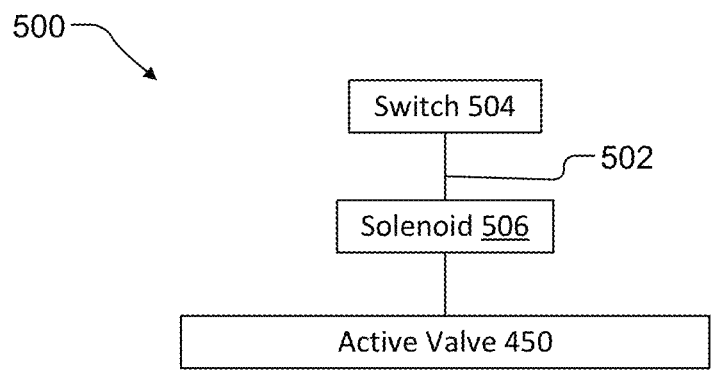
FIG. 5 is a schematic diagram showing a control arrangement for an active valve, in accordance with an embodiment.

FIG. 5 is a schematic diagram showing a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 404 within active valve 450, In one embodiment, the rotation of valve body 404 causes an indexing ring consisting of two opposing, outwardly spring-biased balls to rotate among indentions formed on an inside diameter of a lock ring.

As the valve body 404 rotates, cone shaped member 412 at an opposite end of the valve is advanced or withdrawn from an opening in orifice 402. For example, the valve body 404 is rotationally engaged with the cone shaped member 412. A male hex member extends from an end of the valve body 404 into a female hex profile bore formed in the cone shaped member 412. Such engagement transmits rotation from the valve body 404 to the cone shaped member 412 while allowing axial displacement of the cone shaped member 412 relative to the valve body 404. Therefore, while the body does not axially move upon rotation, the threaded cone shaped member 412 interacts with mating threads formed on an inside diameter of the bore to transmit axial motion, resulting from rotation and based on the pitch of the threads, of the cone shaped member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding shock assembly. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension shock assemblies could be used alone or in combination. That is, one or more active valves could be operated simultaneously or separately depending upon needs in a vehicular suspension system.

For example, a suspension shock assembly could have one, a combination of, or each of an active valve(s): for a bottom out control, an internal bypass, for an external bypass, for a fluid conduit to the external or piggyback reservoir 225, etc. In other words, anywhere there is a fluid flow path within the shock assembly an active valve could be used. Moreover, the active valve could be alone or used in combination with other active valves at other fluid flow paths to automate one or more of the performance characteristics of the shock assembly. Moreover, additional switches could permit individual operation of separate active bottom out valves.

Figure 6:
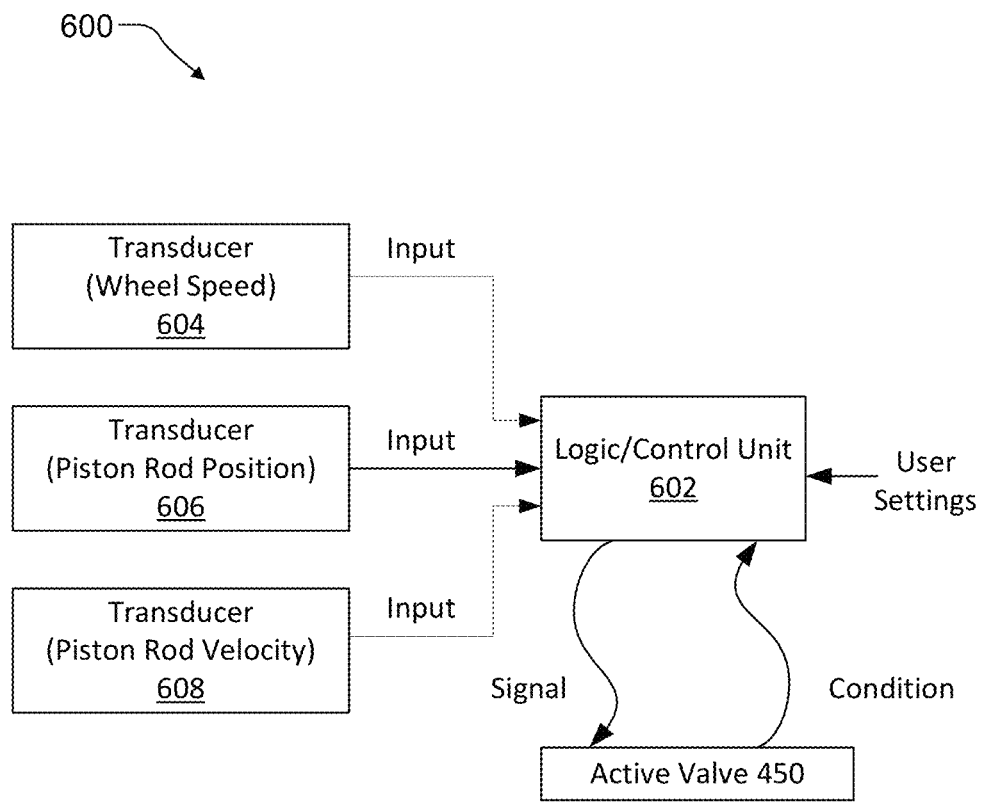
FIG. 6 is a schematic diagram of a control system based upon any or all of vehicle speed, damper rod speed, and damper rod position, in accordance with an embodiment.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle. FIG. 6 shows a schematic diagram of a control system 600 based upon any or all of vehicle speed, damper rod speed, and damper rod position. One embodiment of the arrangement of FIG. 6 is designed to automatically increase damping force in a shock assembly in the event a damper rod reaches a certain velocity in its travel towards the bottom end of a shock assembly at a predetermined speed of the vehicle.

In one embodiment, the control system 600 increases damping force (and control) in the event of rapid operation (e.g. high rod velocity) of the shock assembly to avoid a bottoming out of the damper rod as well as a loss of control that can accompany rapid compression of a shock assembly with a relative long amount of travel. In one embodiment, the control system 600 modifies the damping force (e.g., adjusts the size of the opening of orifice 402 by causing cone shaped member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing cone shaped member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the housing of the shock assembly is determined using an accelerometer to sense modal resonance of the suspension shock assembly or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electromagnetic transducer is incorporated in the housing of the shock assembly to provide a sensor to monitor the position and/or speed of the piston (and suitable magnetic tag) with respect to a housing of the suspension shock assembly.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension shock assembly measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between cone shaped member 412 and orifice 402). Thereafter, the condition, state or position of active valve 450 is relayed back to logic unit 602 via an active valve monitor or the like.

In one embodiment, logic unit 602 shown in FIG. 6 assumes a single active valve 450 corresponding to a single orifice 402 of a single shock assembly, but logic unit 602 is usable with any number of active valves or groups of active valves corresponding to any number of orifices, or groups of orifices. For instance, the suspension shock assemblies on one side of the vehicle can be acted upon while the vehicles other suspension shock assemblies remain unaffected.

In one embodiment, by utilizing the newly acquired ability to modify the performance of the shock assembly, a number of additional benefits are realized. One benefit is realized by shock assembly manufactures. Although they will still need to manufacture a number of different shock assemblies (or components) due to one or more different external geometries of different shock assemblies; they will not need to include an additional step of modifying (or tuning) the size of the internal air chamber or the range of travel of the shock assembly.

Another benefit is realized by the seller who will be able to stock fewer pre-configured aftermarket (AM) shock assemblies. For example, the seller could stock a number of shock assemblies A that have a first geometry, e.g., each shock assembly A having the same external geometries, e.g., eyelet-to-eyelet length, exterior sizing, range of travel, etc. The seller could also stock a number of shock assemblies B, (designed with one or more different external geometries than the external geometries of shock assembly) e.g., shock assembly B having the same external geometries, e.g., eyelet-to-eyelet length, exterior sizing, range of travel, etc.

Moreover, the seller would be able to make aftermarket or custom adjustments to the performance of the shock assembly, by adding (or removing) one or more travel spacers to the internal air chamber prior to shipment. A dealer would similarly be able to make aftermarket or custom adjustments to the performance of the shock assembly, by adding (or removing) one or more travel spacers to the internal air chamber.

Reference throughout this document to "one embodiment," "certain embodiments," "an embodiment," "various embodiments," "some embodiments," or similar terminology, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

What we claim is:

1. A travel spacer assembly comprising:
    a retaining cap comprising:
        a retaining cap thickness; and
        a retaining cap opening therethrough, said retaining cap opening having a diameter (D) that is larger than an outer diameter (OD) of a shaft of a shock assembly;
    at least one fastener to fasten said retaining cap with a portion of said shock assembly about said shaft, such that said retaining cap reduces a stroke length of said shaft of said shock assembly by said retaining cap thickness;
    at least one travel spacer comprising:
        a travel spacer thickness;
        a travel spacer opening therethrough, said travel spacer opening having a diameter that is larger than said OD of said shaft of said shock assembly; and
        at least two separable pieces, such that said travel spacer is installed about said shaft of said shock assembly to form said at least one travel spacer, such that said travel spacer is configured to be installed about said shaft of said shock assembly to form said travel spacer without requiring removal of said shaft from said shock assembly, said travel spacer reducing said stroke length of said shaft of said shock assembly by said travel spacer thickness to enable an end user to customize said stroke length for said shock assembly;
    an air sleeve of said shock assembly to form an air chamber;
    a piston coupled with said shaft;
        said piston dividing said air chamber into a positive air chamber side and a negative air chamber side; and
        said at least one travel spacer coupled to said negative air chamber side of said shaft.

2. The travel spacer assembly of claim 1, further comprising:
    at least one attachment hole in said retaining cap; and
    said at least one fastener inserted into said attachment hole to couple said retaining cap with said portion of said shock assembly.

3. The travel spacer assembly of claim 1, further comprising:
    an OD of said retaining cap, said OD of said retaining cap smaller than an inner diameter (ID) of a helical spring of said shock assembly.

4. The travel spacer assembly of claim 1, further comprising:
    an OD of said retaining cap, said OD of said retaining cap smaller than an inner diameter (ID) of an air sleeve of said shock assembly.

5. The travel spacer assembly of claim 1, further comprising:
    a geometric shape of said retaining cap selectively configured to displace a volume of air wherein, said volume of air is equal to $\pi/4$ times the square of said diameter (D),
    said displacement of said volume of air modifying a performance characteristic of said shock assembly in addition to reducing said stroke length of said shaft.

6. The assembly of claim 1, further comprising:
    a geometric shape of said retaining cap selectively configured to displace volume of air wherein, said volume of air is less than $\pi/4$ times the square of said diameter (D),
    said displacement of said volume of air modifying a performance characteristic of said shock assembly in addition to reducing said stroke length of said shaft.

7. The travel spacer assembly of claim 1 further comprising:
    a geometry of said at least one travel spacer based on an amount of air displacement of said at least one travel spacer, wherein said amount of said air displacement modifies a performance characteristic of said shock assembly in addition to reducing said stroke length of said shaft.

8. The travel spacer assembly of claim 1 further comprising:
    said at least one fastener to fasten said retaining cap and said at least one travel spacer with said portion of said shock assembly about said shaft.

9. The travel spacer assembly of claim 1 further comprising:
    a travel spacer retainer to retain said at least one travel spacer with said shaft of said shock assembly, such that said at least one travel spacer does not need an attachment hole therethrough, said travel spacer retainer selected from a group consisting of: a clip, a hook, and a snap.

10. The travel spacer assembly of claim 1, further comprising:
- an air sleeve of said shock assembly to form an air chamber;
- a piston coupled with said shaft;
  - said piston dividing said air chamber into a positive air chamber side and a negative air chamber side; and
  - said at least one travel spacer coupled to said positive air chamber side of said shaft.

11. The travel spacer assembly of claim 1, further comprising:
- an OD of said at least one travel spacer, said OD of said at least one travel spacer smaller than an inner diameter (ID) of an air sleeve of said shock assembly.

12. The travel spacer assembly of claim 1, further comprising:
- an OD of said retaining cap, said OD of said retaining cap smaller than an inner diameter (ID) of a helical spring of said shock assembly; and
- an OD of said at least one travel spacer, said OD of said at least one travel spacer smaller than said ID of said helical spring of said shock assembly.

\* \* \* \* \*